March 10, 1970  J. A. FERNHOLZ ET AL  3,499,658
WHEELED HAND TRUCK
Filed April 19, 1968  2 Sheets-Sheet 1

INVENTORS
JAMES A. FERNHOLZ
LYALL B. WHITE
BY Andrus & Starke
Attorneys

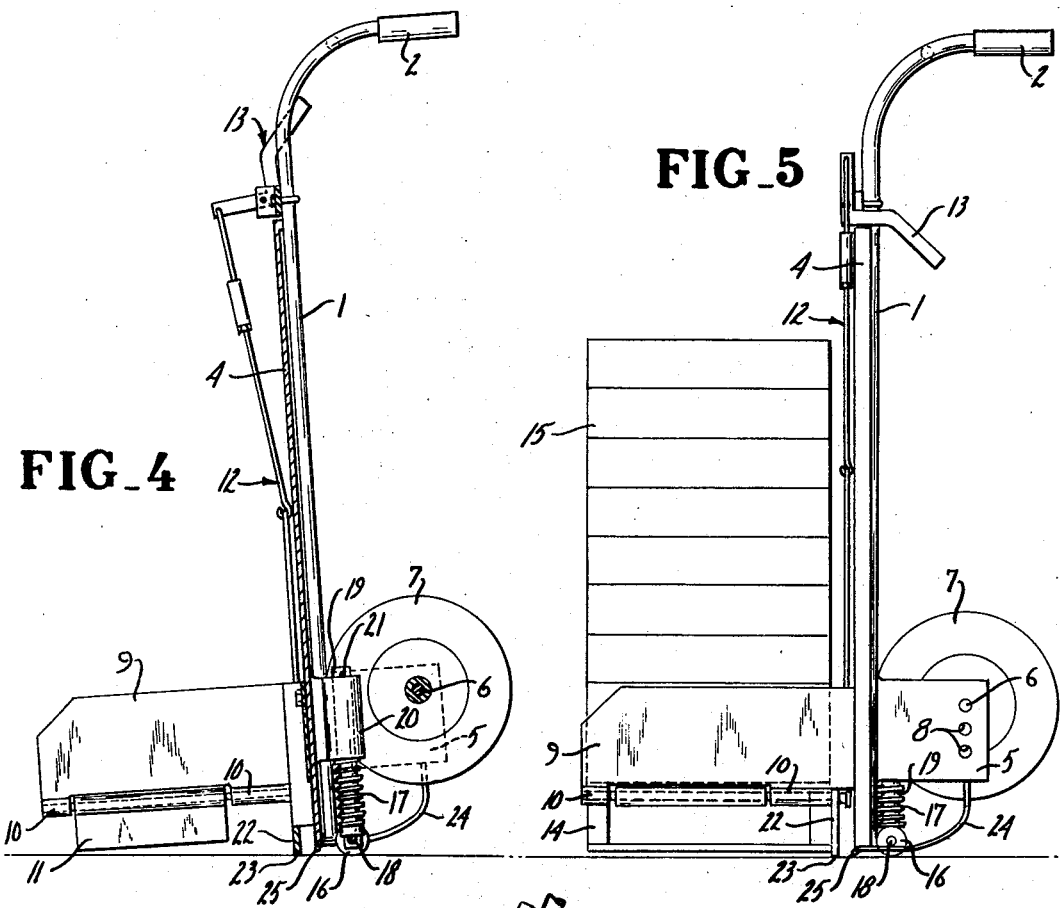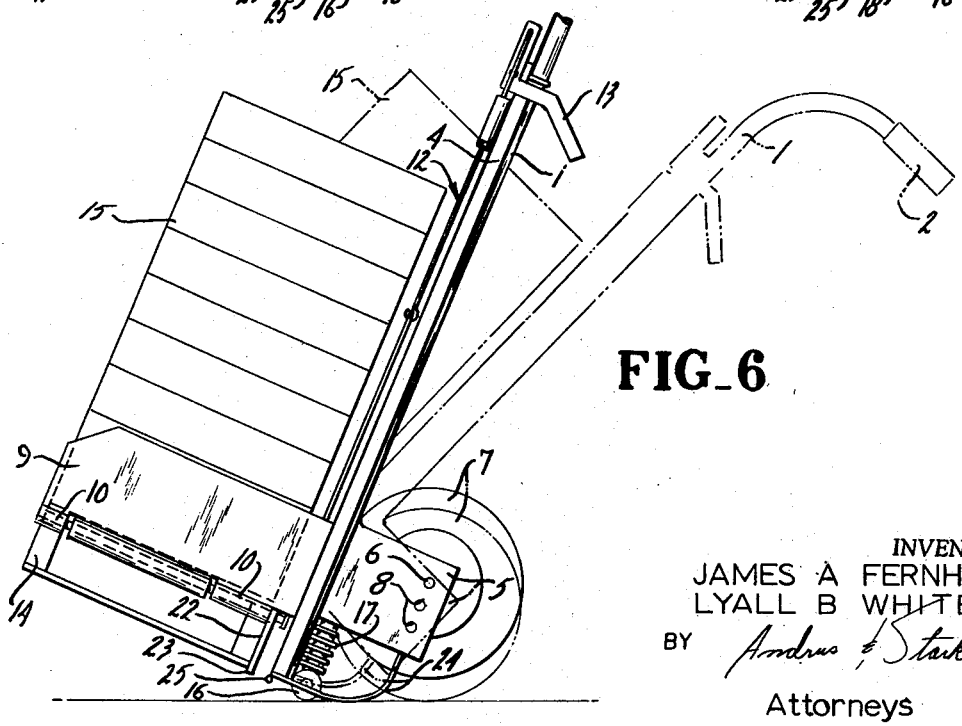

United States Patent Office 3,499,658
Patented Mar. 10, 1970

3,499,658
WHEELED HAND TRUCK
James A. Fernholz, Trempealeau, Wis., and Lyall B. White, Zephyrhills, Fla., assignors to L. B. White Company, Inc., La Crosse, Wis., a corporation of Wisconsin
Filed Apr. 19, 1968, Ser. No. 722,726
Int. Cl. B62b 1/08
U.S. Cl. 280—47.2                                4 Claims

ABSTRACT OF THE DISCLOSURE

A tiltable hand truck having a frame and primary wheels for transporting a load. A pair of hinged wing members extend forwardly from the frame and are manually pivoted to enter the open ends of a pallet. A pair of downwardly biased pilot wheels provide the sole rolling support for the unloaded truck when it is moved in an upright position. The pilot wheels cooperate with a cross bar to support a free standing truck. When the load is placed on the truck, the pilot wheels retract so that the truck rests on the cross bar and tilting of the loaded truck moves the fulcrum from the cross bar rearwardly along a pair of curved skids.

---

Figure 1:
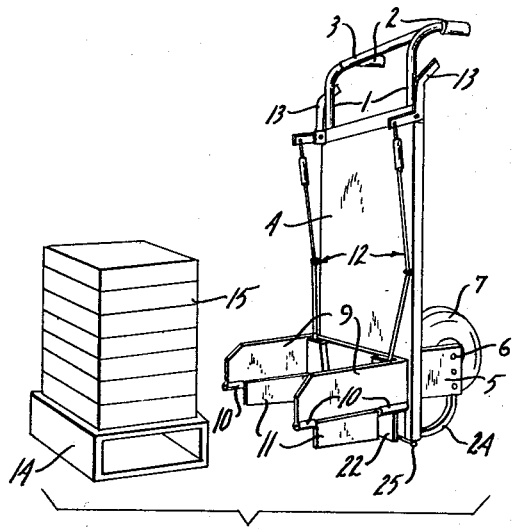

This invention relates to a wheeled hand truck, and more particularly to a hand truck for handling palletized loads, such as bricks and blocks.

It has been known for some time that heavy loads could be moved by using a hand truck having a load platform and a generally perpendicular back frame. The load platform was maneuvered beneath the load, and the truck then tilted backwards for transporting the load as if it were in a wheelbarrow with the load resting partly on the platform and partly on the back frame. While relatively simple hand trucks have been used to advantage, there has been a need for more sophisticated devices which allow speedier loading and more ease in handling larger loads.

Previous devices, such as in U.S. Patent No. 1,542,327, have been provided with rollers or small wheels on the bottom edge of the frame. Such devices have provided problems when the loaded truck was tilted backwards to the transporting position. The rollers or wheels would tend to move forward in an undesirable manner when tilting was attempted, thus creating instability.

The present invention solves the aforementioned and other problems, and provides a substantially improved device.

Generally in accordance with the invention, a hand truck is provided with a generally L-shaped framework having a fulcrum bar at the lower end thereof. The bar is disposed closely adjacent curved skids which extend toward the main supporting wheels. Furthermore, spring-biased pilot wheels are disposed adjacent the fulcrum bar and assist in bringing the load down onto the bar. In addition, a load platform is provided with movable wings which can be selectively pivoted into horizontal position to enter and support a pallet.

The accompanying drawings illustrate the best mode presently contemplated by the inventors for carrying out the invention.

Figure 2:
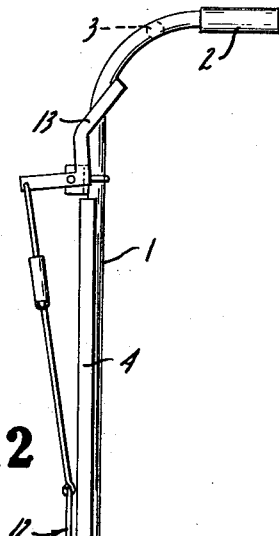
Figure 3:
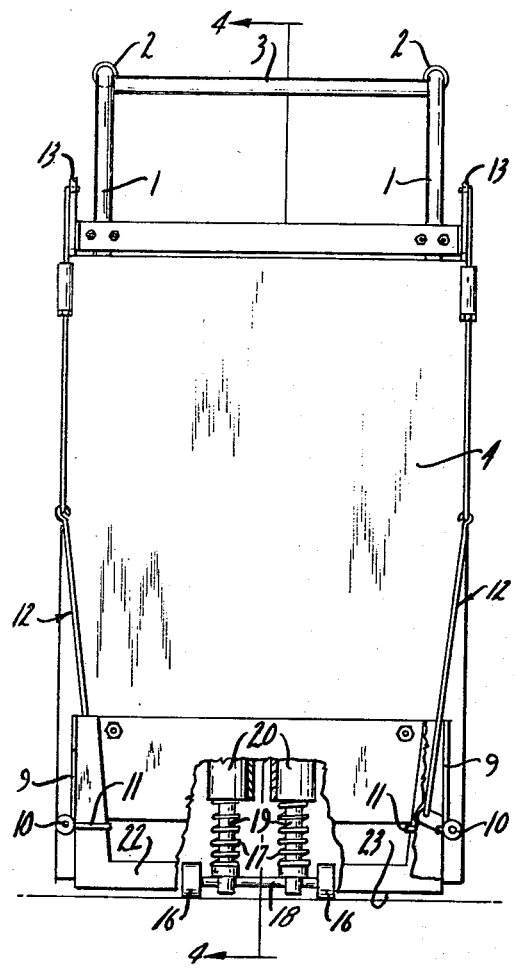

In the drawings:

FIGURE 1 is a perspective view of a wheeled hand truck constructed in accordance with the invention, showing the truck in vertical pick-up position adjacent a palletized load;

FIG. 2 is a side elevation of the truck;
FIG. 3 is a front elevation of the truck;
FIG. 4 is a vertical section taken on line 4—4 of FIG. 3, and showing the truck in the free standing position;
FIG. 5 is a side elevation showing the loaded truck at the moment of beginning of rearward tilt; and
FIG. 6 is a view similar to FIG. 5 and showing further positions during tilting.

As shown in the drawings, the hand truck comprises a generally upright framework comprising a pair of spaced side rails 1 providing handles 2 at their upper ends and having suitable cross braces 3. A further cross brace in the form of a plate 4 extends between rails 1 adjacent their lower ends. For purposes of transporting a loaded truck, a pair of spaced flanges 5 are secured to the lower portion of rails 3 and extend rearwardly therefrom. Flanges 5 serve as bearing supports for an axle 6 which in turn carries a pair of relatively large wheels 7 which extend rearwardly from and above the lower end of the framework. If desired, a plurality of pairs of axle bearing openings 8 may be disposed in flanges 5 so that the axle may be selectively disposed in a variety of positions.

The hand truck is adapted to support a palletized load. For this purpose, a pair of spaced load supporting lugs 9 are secured to plate 4 and extend forwardly from the lower portion therefrom. The lower edges of lugs 9 form hinge means 10 which pivotally support a pair of flat wings 11. Each wing 11 is connected through suitable linkages 12 to a hand lever 13 mounted adjacent the upper portion of the respective side rail 1. Operation of levers 13 will shift wings 11 between a free downwardly extending vertical position shown in FIGURE 1 to a pallet-supporting horizontal position shown in FIG. 3. When wings 11 are vertical, the truck can be brought up to an open-ended pallet 14 of suitable size and having a load 15 thereon. Wings 11 are then pivoted horizontally into the open pallet ends for supporting the load, as will be more fully described hereinafter.

The invention contemplates facilitating bringing an empty truck up to a palletized load. For this and other purposes, a pair of retractable pilot wheels 16 are disposed between wheels 7 and just rearwardly of the lower ends of rails 1 and are biased downwardly by suitable springs 17 to a normal position slightly below the lower ends of rails 1. Wheels 16 may be coupled together through a common axle 18, and springs 17 are shown as being mounted on shafts 19 which slide in sleeves 20 secured to plate 4. A pin 21 provides a stop to limit the downward biased position of each wheel 16. When the truck is held in a vertical position as shown in FIG. 2, it can be rolled along the ground into or out of position relative to pallet 14. In this instance, wheels 16 provide the sole truck support.

In many instances, it may be desirable to store an unloaded truck in a generally upright position. For this and other purposes, and as best shown in FIG. 4, a fixed cross bar 22 is secured between lugs 9 and extends downwardly to provide a transverse edge 23 disposed vertically below the lower ends of rails 1 but above the lowermost extent of pilot wheels 16 when the latter are in their normal fully extended position. The truck may thus be tilted slightly forwardly so that it rests on edge 23 and pilot wheels 16, which function as the sole support for the freely standing truck. However, in normal operation, as seen in FIG. 2, edge 23 is off the ground or supporting surface to permit rolling of the truck on pilot wheels 16.

Once the truck has been moved to adjacent pallet 14 and wings 11 pivoted into the pallet openings, it is desired to lift the load from the ground and tilt the truck until all the weight is on the primary wheels 7. As the truck is initially tilted back, the weight of load 15 will bear on lugs 9 and wings 11. This will overcome the strength of the spring biasing force at pilot wheels 16, causing them to retract and causing the truck to lower onto cross bar 22, as shown in FIG. 5. The truck will now be stabilized and is prevented from rolling.

Cross bar 22 now acts as a primary fulcrum. Further rearward tilting requires that the fulcrum move progressively rearwardly until wheels 7 support the load. For this purpose, a pair of curved skid bars 24 are connected at one end to the lower ends of rails 1 and at the other end to flanges 5 adjacent wheels 7. The forward skid bar ends commence just slightly rearwardly of cross bar edge 23. Thus, as the load is further tilted rearwardly, (see FIG. 6) the fulcrum moves from edge 23 to a transverse forward rod 25 extending between skid bars 24 and hence rearwardly on bars 24 in a substantially continuous action to wheels 7.

The truck of the invention has been found to be substantially more stable than prior trucks and can handle very heavy loads. While the pallet mechanism has been shown as a generally integral part of the truck, the pallet mechanism could be formed as an attachment for different types of trucks without departing from the spirit of the invention.

We claim:
1. A titltable hand truck comprising, in combination:
  (a) a generally upright frame,
  (b) support means extending forwardly from the lower portion of said frame for supporting a load,
  (c) primary wheels extending rearwardly from said frame and above the lower end thereof,
  (d) curved skid means extending rearwardly from the lower end of said frame to adjacent said primary wheels,
  (e) pilot wheels disposed just rearwardly of the lower end portion of said frame,
  (f) means to bias said pilot wheels downwardly to normal po sition below said frame and said skid means,
  (g) a fixed cross bar disposed forwardly of the lower end of said frame, said bar having a transverse edge disposed below said frame and skid means,
  (h) said pilot wheels being retractable under the weight of a load on said support means to lower said truck so that its weight is supported on said edge,
  (i) the construction being such that, as a loaded truck is tilted rearwardly, its weight support will be shitfed from said edge and along said skid means and hence to said primary wheels.

2. The hand truck of claim 1 which includes stop means to limit the downward extent of said pilot wheels under the force of said biasing means.

3. The hand truck of claim 1
  (a) in which said pilot wheels are mounted on an axle,
  (b) and in which said biasing means comprises springs extending between said axle and said frame.

4. The hand truck of claim 3 which includes stop means to limit the downward extent of said pilot wheels under the force of said biasing means.

References Cited

UNITED STATES PATENTS 2,665,018  1/1954  Salsas _____ 214—377 X

FOREIGN PATENTS 791,945  12/1935  France.
689,124  3/1953  Great Britain.
822,481  10/1959  Great Britain.
163,055  4/1958  Sweden.

BENJAMIN HERSH, Primary Examiner

JOHN A. PEKAR, Assistant Examiner

U.S. Cl. X.R.

214—377